June 22, 1948.  B. F. ARPS  2,443,883
MATERIAL ENGAGING AND MOVING
ATTACHMENT FOR TRACTORS
Filed Nov. 8, 1945  4 Sheets-Sheet 1
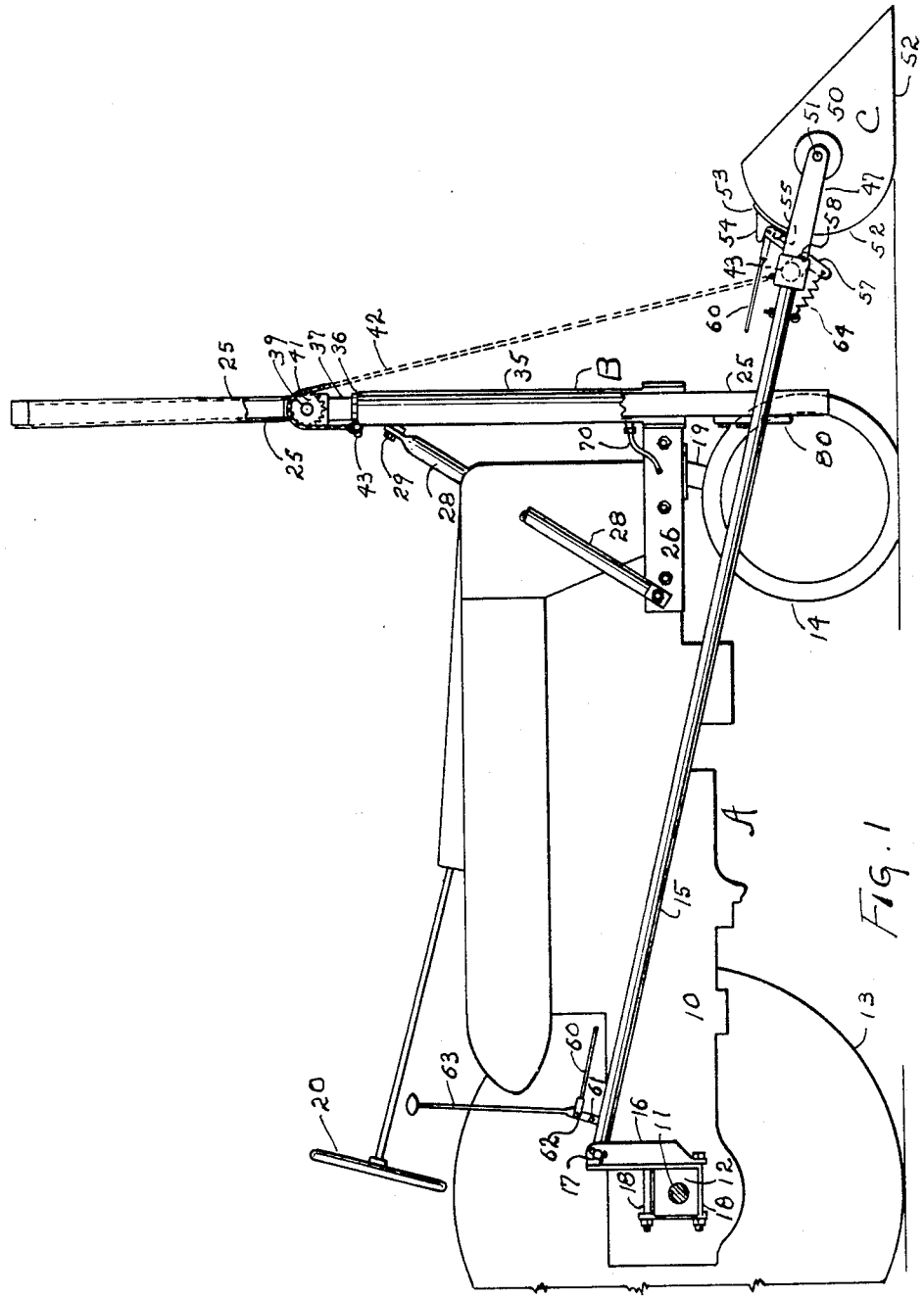
INVENTOR.
BRUNO F. ARPS
BY
ATTORNEY June 22, 1948.　　　　B. F. ARPS　　　　2,443,883
MATERIAL ENGAGING AND MOVING
ATTACHMENT FOR TRACTORS
Filed Nov. 8, 1945　　　　　　　　　　　　4 Sheets-Sheet 2
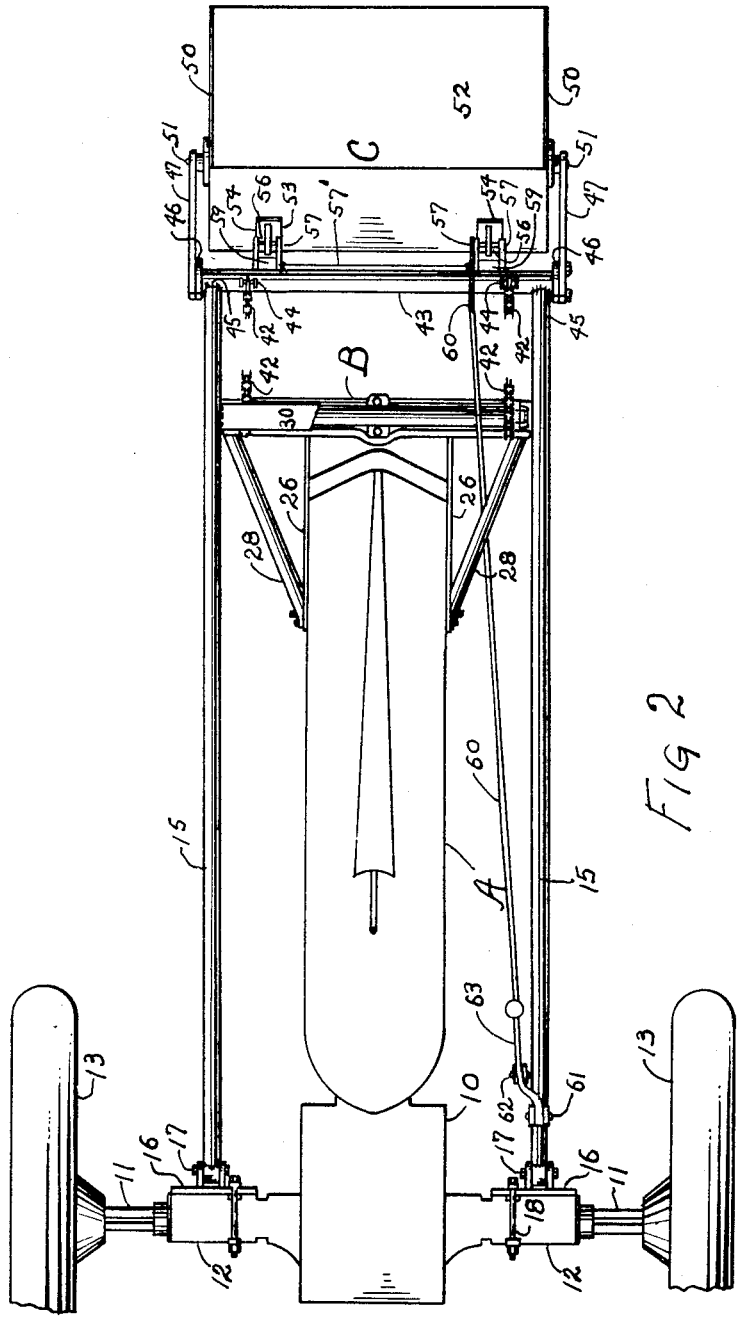
INVENTOR.
BRUNO F. ARPS
BY
ATTORNEY June 22, 1948.　　　　B. F. ARPS　　　　2,443,883
MATERIAL ENGAGING AND MOVING
ATTACHMENT FOR TRACTORS
Filed Nov. 8, 1945　　　　　　　　　　4 Sheets-Sheet 3
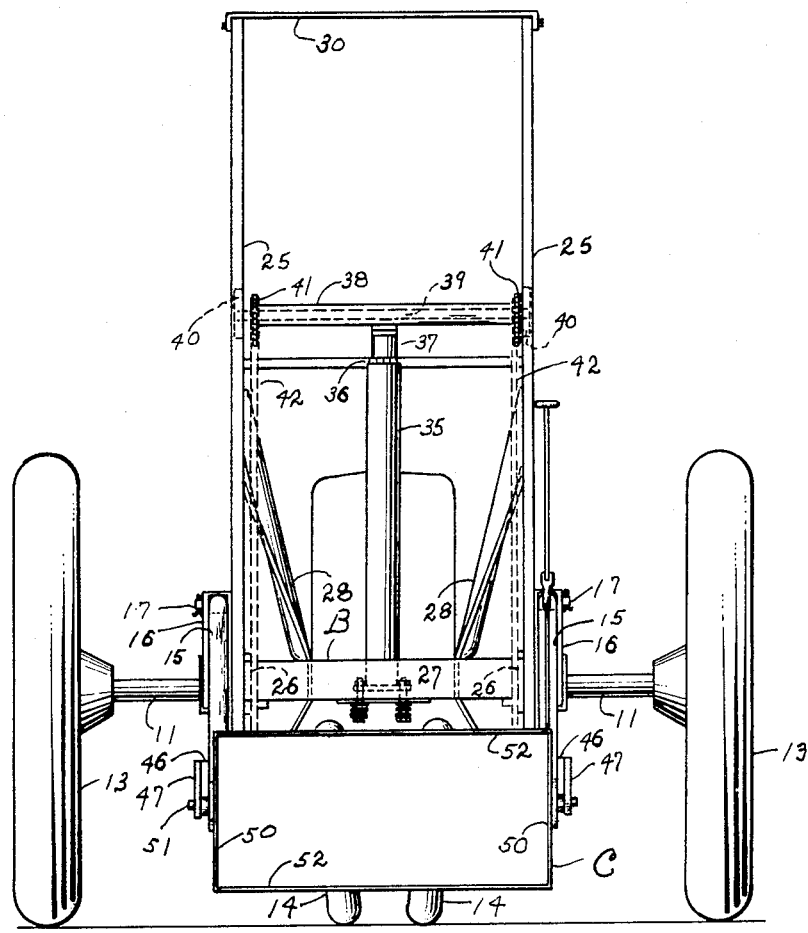
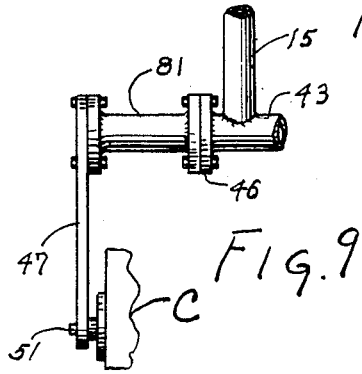
INVENTOR.
BRUNO F. ARPS
BY
ATTORNEY

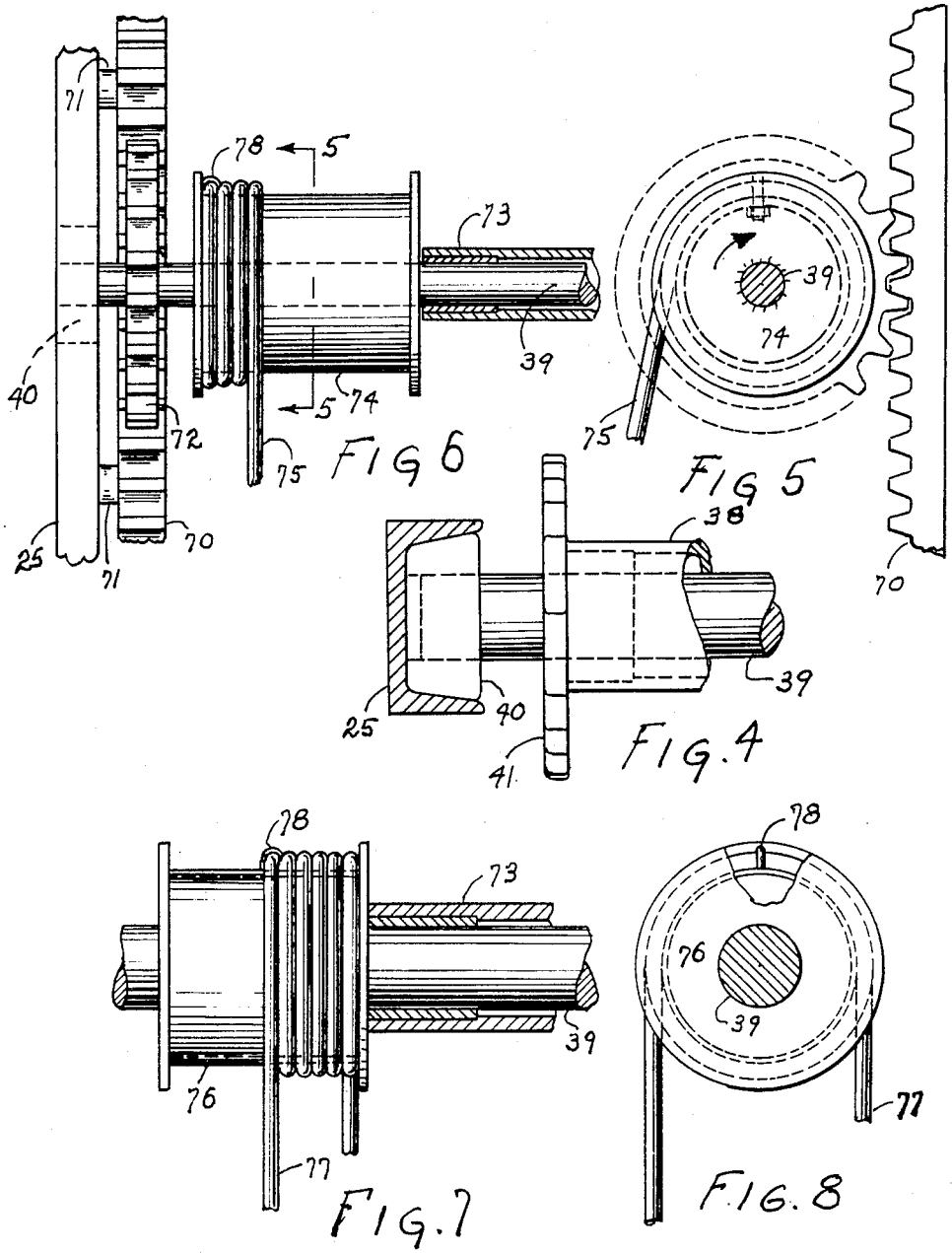

Patented June 22, 1948

2,443,883

UNITED STATES PATENT OFFICE 2,443,883

MATERIAL ENGAGING AND MOVING ATTACHMENT FOR TRACTORS

Bruno F. Arps, New Holstein, Wis.

Application November 8, 1945, Serial No. 627,363

6 Claims. (Cl. 214—140)

The present invention relates to a device adapted to be attached to a tractor having engaging means for picking up and dumping materials or for moving dirt and snow bulldozer fashion or for grading and the like.

The principal object of the present invention is to provide a device of the character which can be applied to a multiplicity of uses so the purchaser can secure all of the attachments for such uses at will and at a reasonable price.

An object of the present invention is to provide a device which can be easily attached to a tractor and to which the various material engaging units can be easily attached and detached and provide a device which is constructed largely of steel bars and tubes, so the device is light and strong, easily manufactured at low cost, easily attached and easily operated.

An important object of the present invention is to provide a device to which a dump scoop may be attached for picking up, moving and dumping the material at will.

Modern tractors are perfectly suited to carry applicant's device, they are easily handled, so material picked up by means of a scoop, rake and the like may be quickly dumped in a carrying wagon or on the ground where and as desired. Furthermore applicant's device is provided with a hydraulic lift which assists the operator in the various operations.

It is an object of the present invention to provide an adapter for the device to which the various engaging means may be easily attached and detached, whereby any one or all of the engaging means may be purchased at the convenience of the owner of the tractor.

To these and other useful ends my invention consists of parts, combinations of parts or their equivalents and mode of operation as hereinafter described and claimed and shown in the accompanying drawings in which:

Fig. 1 is a side elevational view of a conventional tractor equipped with my invention and having attached thereto a pick-up and dump scoop.

Fig. 2 is a top view of the device as shown in Figure 1.

Fig. 3 is a front view of the device as shown in Figure 1.

Fig. 4 is an enlarged view of a fraction of the device as shown in Figures 1, 2 and 3.

Figs. 5, 6, 7, 8 and 9 are views of modifications.

As thus illustrated the tractor in its entirety is designated by reference character A; the frame which is secured to the forward end of the tractor is designated in its entirety by reference character B; the scoop shown in Figures 1, 2 and 3 is designated in its entirety by reference character C.

Tractors of the class are equipped with hydraulic pumps which are generally mounted within the frame 10 and near the upper rear corner thereof and having associated therewith a controlling valve for a purpose which will hereinafter appear. The hydraulic pump and controlling valve are too well known to require illustration and description.

Member A comprises a frame 10 having mounted preferably within its rear end the usual differential to which the inner ends of axles 11—11 are operatively connected, the axles extending through axle housings 12—12 and having mounted on their outer ends ground wheels 13—13, for convenience the front axles and wheels are omitted in Figures 2 and 3. The front wheels however in Figure 1 are designated by reference numeral 14. I provide push bars 15—15 which are pivotally connected at their rear ends to brackets 16—16 as at 17—17, brackets 16 being secured to members 12 by means of bolts 18. Thus the forward end of bars 15 are free to move up and down on 17 as an axis.

Tractors of the lighter design generally have two front wheels 14, the lower sides of which are positioned close together so a conventional axle is not necessary, the wheels being rotatably mounted on a post 19 which is operatively connected to the steering wheel 20 (see Figure 1).

Frame B comprises spaced apart vertically arranged posts 25—25 which are rigidly secured to the tractor by means of side plates 26—26 and a transverse member 27. I provide braces 28—28 which are attached to the rear ends of members 26, and to posts 25 as at 29. Thus it will be seen that member B is rigidly secured to the tractor, but in a manner whereby it will only be necessary to detach members 26 in order to remove this member from the tractor.

The tops of posts 25 are secured together by means of a brace 30. In order to clearly illustrate the hydraulic cylinder of my device, the center portion of the near member 25 (in Figure 1) has been cut away. The lower ends of members 25 extend downward a distance. Members 15 loosely engage the outsides of posts 25, thus to form a guideway for these members.

I provide a hydraulic cylinder 35 which is at its bottom secured to member 27 terminating at its top as at 36. Cylinder 35 has a protruding piston 37, the upper end of which is secured to a cross tube 38, the ends of which terminate a short distance from posts 25. A shaft 39 is rotatably mounted in tube 38, the ends protruding. Members 25 are channel bars, their flanges turned inwardly and having slidably mounted between these flanges blocks 40—40 into which the ends of shaft 39 are rotatably mounted. Near the ends of member 39 I rigidly mount sprockets 41—41.

Chains 42—42 are engaged by sprockets 41, their upper ends being anchored to posts 25 as at 43, the fastenings to members 25 not being shown. Chains 42—42 extend downwardly and forwardly, the lower ends being anchored to a cross tube 43 as at 44—44, the forward ends of members 15 being welded to member 43 as at 45. Thus it will be seen, that when tube 38 is raised or lowered by piston 37, the lower ends of the chains will always be in the same transverse position and will hold scoop C in this position when raised and lowered, regardless of the distribution of the weight of material in the scoop.

Bars 47—47 are at their rear ends secured to tube 43 as at 46. The side plates 50—50 of scoop C are pivotally mounted to the forward ends of members 47 as at 51—51. The bottom and rear closure for scoop C is designated by reference numeral 52. Brackets 53—53 are secured to member 52, these brackets having rearwardly extending stops 54—54 and 55—55 which embrace rollers 56, the rollers being carried on the upper ends of spaced bars 57—57, the bars being pivoted to brackets 59 as at 58 and the brackets being secured to tube 43.

Members 57 are secured together by means of a tube or bar 57' so rollers 56 will be caused to disengage members 55 simultaneously by pulling on one of members 57.

I pivotally secure the forward end of a rod 60 to one of members 57. On the rear end of member 15 I pivotally secure a lever 63 as at 61 and pivotally connect the rear end of rod 60 to lever 63 as at 62, thus by pulling on lever 63 the operator can disengage members 55 from members 56 permitting the scoop to tilt forward on member 51 as an axis.

Springs 64 are adapted to urge members 56 forwardly and the lower sides of members 55 are suitably shaped so when scoop C returns to its loading position, members 56 will travel over member 55 and will again be engaged by members 54 and 55. Projections 54 are long enough so members 56 can not be moved rearwardly far enough to be out of contact with the under side of this member.

At the bottom of cylinder 35 I connect a tube 70, having an operating connection to a control valve associated with the hydraulic pump. This pump is preferably the one used for operating the standard hydraulic lift on the tractor.

It will be seen that the operator by manipulating the tractor and valve, can load the scoop and raise it to the desired height and then move the tractor and drop the load either in a conveyance or wherever it is desired to drop it, by pulling lever 63.

Clearly any form of material engaging means may be substituted for the scoop, such as a scraper blade or a sweep rake.

In Figure 4 I illustrate in detail posts 25, tube 38, sliding block 40 and sprocket 41, the hub of the sprocket being rotatably mounted in the end of the tube and the sprocket being welded to shaft 39. This is the design shown in Figures 1, 2 and 3.

In Figures 5 and 6 I illustrate a modification wherein toothed racks 70 are mounted on posts 25 by means of brackets 71. A toothed gear 72 is secured to shaft 39, the gears of which are adapted to mesh the teeth in rack 70. A tube 73 similar to tube 38 is secured to the protruding end of piston 37. Drums 74—74 are rigidly secured to shaft 39, each drum having a cable 75 which at one end is secured to the drum, the other end being secured to tube 43 similar to the chain fastening to this tube. Thus it will be seen that as tube 43 is raised by the piston, gears 72 will be turned in the direction shown by the curvilinear arrow in Figure 5, thus to raise and lower the scoop or whatever device is attached to members 43 and at about the same speed or faster than the scoop would be raised relative to the movement of piston 37 as in Figures 1, 2 and 3.

Still another connection between the piston and the scoop is illustrated in Figures 7 and 8. In these figures drums 76—76 are secured to shaft 39. The rear ends of cables 77 are anchored to adjacent posts 25, the other ends of the cables being anchored to tube 43 similar to the fastening of chains 42 to this tube. In order to insure parallel movement of tube 43, cables 77 may be suitably anchored to their respective drums as at 78. Thus it will be seen that an important part of the design is the manner of forming a connection from the piston to tube 43, so this tube will always move in a horizontal position whether the material is equally distributed transversely on the scoop or not.

I provide stops 80 which are vertically adjustably secured to the lower ends of members 25. Thus the downward movement of tube 43 and the material contacting device may be definitely limited, this stop being desirable when a scraper blade of some sort is attached to members 47 or when a pick up rake is attached to these members so the rake will just skim over the surface of the ground. Generally when using the scoop its depth can be regulated by means of the hydraulic lift. However for certain operations it is desirable to have these stops act to definitely limit the downward movement of the forward ends of members 15.

In some instances it is desirable to have members 47 spaced further apart. Members 47 are detachably secured to member 46 and when it is desired to use an especially wide scoop or other device, an adapter 81 is used for the purpose.

Having thus shown and described my invention I claim:

1. In combination with a tractor having a hydraulic pump and a valve associated therewith, push bars positioned on opposite sides of the tractor and being hingedly connected at their rear ends to the rear end of the tractor, their front ends having an adapter secured thereto, a frame secured to the front end of the tractor having transversely spaced apart vertically arranged posts, a hydraulic cylinder secured at its lower end to said frame, a piston in said cylinder, its upper end protruding, a transverse tube secured to the upper end of said piston, its ends terminating a distance from said posts, a shaft rotatably mounted in said tube, its ends being rotatably and slidably mounted on said posts, racks secured to said post on the inner side thereof, pinions secured to said shaft having teeth adapted to engage said racks, drums rigidly secured to said shaft, flexible cables adapted to wind around said drums, one end being secured thereto and the other ends being secured to said adapter in transverse spaced relation, whereby when the drums are moved upwardly by the piston, the cables will be wound on the drums to thereby raise the adapter.

2. The combination of a tractor having a hydraulic pump and a valve associated therewith, push bars positioned on opposite sides of the tractor, their rear ends being hingedly connected to the rear end of the tractor, a transverse member secured to the front ends of said push bars, forwardly extending elements detachably secured at their rear ends to the ends of said transverse members, a frame secured to the front end of the tractor having transversely spaced apart vertically arranged posts, said posts adapted to loosely contact the inner sides of said push bars, a hydraulic cylinder secured at its lower end to said frame, a piston in said cylinder, its upper end protruding, an assembly element secured to the upper end of said piston, its ends being slidably mounted on said posts, means associated with said assembly element having connections to said transverse member in spaced relation and to the posts, whereby when said piston is raised and retracted said transverse member will be raised and lowered, a dump scoop hingedly mounted on the front ends of said forwardly extending elements, locking means mounted on said first transverse member, means on said scoop adapted to be engaged by said locking means, to hold the scoop in a loading position, said locking means having a connection which extends to within reach of the operator, whereby the operator may disengage the locking means and permit the scoop to tilt forward for dumping.

3. A device as recited in claim 2 including, said posts extending downwardly for a distance below the body of the frame, and being positioned to slidably contact said push bars to thereby determine the transverse position of the forward ends thereof, adjustably secured stops on the lower ends of said posts adapted to limit the downward position of the front ends of said push bars.

4. In combination with a tractor having a hydraulic pump and a valve associated therewith, push bars positioned on opposite sides of the tractor and being hingedly connected at their rear ends to the rear end of the tractor, a frame secured to the front end of the tractor having transversely spaced apart vertically arranged posts, a hydraulic cylinder secured at its lower end to said frame, a piston in said cylinder, its upper end protruding, a transverse tube secured to the upper end of said piston, its ends terminating a short distance from said posts, a shaft rotatably mounted in said tube, its ends being rotatably and slidably mounted on said posts, sprockets securely mounted on said shaft adjacent the ends of the tube, chains engaged by said sprockets, their upper ends being secured to said posts a distance below said sprockets when said piston is fully retracted, an adapter secured to the forward ends of said push bars, the forward ends of said chains being secured to said adapter in transversely spaced relation, said adapter being formed for detachable connections to a material engaging means, a tube forming an operating connection between said valve and the bottom of said cylinder, whereby the operator may by manipulating the valve, raise and lower said adapter, said posts extending downwardly for a distance below the body of said frame, and being positioned to slidably contact said push bars to thereby determine the transverse position of the forward ends thereof.

5. In combination with a tractor having a hydraulic pump and a valve associated therewith, push bars positioned on opposite sides of the tractor and being hingedly connected at their rear ends to the rear end of the tractor, a frame secured to the front end of the tractor having transversely spaced apart vertically arranged posts, a hydraulic cylinder secured at its lower end to said frame, a piston in said cylinder, its upper end protruding, a transverse tube secured to the upper end of said piston, its ends terminating a short distance from said posts, a shaft rotatably mounted in said tube, its ends being rotatably and slidably mounted on said posts, sprockets securely mounted on said shaft adjacent the ends of the tube, chains engaged by said sprockets, their upper ends being secured to said posts a distance below said sprockets when said piston is fully retracted, an adapter secured to the forward ends of said push bars, the forward ends of said chains being secured to said adapter in transversely spaced relation, said adapter being formed for detachable connections to a material engaging means, a tube forming an operating connection between said valve and the bottom of said cylinder, whereby the operator may by manipulating the valve, raise and lower said adapter, said material engaging means comprising a dump type scoop pivotally mounted on the adapter, locking means mounted on the adapter, means on said scoop adapted to be engaged by said locking means, to hold the scoop in a loading position, means within reach of the operator having a connection to said locking means, whereby the operator may disengage the locking means and permit the scoop to tilt forward for dumping.

6. In combination with a tractor having a hydraulic pump and a valve associated therewith, push bars positioned on opposite sides of the tractor and being hingedly connected at their rear ends to the rear end of the tractor, a frame secured to the front end of the tractor having transversely spaced apart vertically arranged posts, a hydraulic cylinder secured at its lower end to said frame, a piston in said cylinder, its upper end protruding, a transverse tube secured to the upper end of said piston, its ends terminating a short distance from said posts, a shaft rotatably mounted in said tube, its ends being rotatably and slidably mounted on said posts, sprockets securely mounted on said shaft adjacent the ends of the tube, chains engaged by said sprockets, their upper ends being secured to said posts a distance below said sprockets when said piston is fully retracted, an adapter secured to the forward ends of said push bars, the forward ends of said chains being secured to said adapter in transversely spaced relation, said adapter being formed for detachable connections to a material engaging means, a tube forming an operating connection between said valve and the bottom of said cylinder, whereby the operator may by manipulating the valve, raise and lower said adapter, said posts extending downwardly for a distance below the body of said frame, and being positioned to slidably contact said push bars to thereby determine the transverse position of the forward ends thereof, vertically adjustable stop brackets secured to said downwardly extending portions of the posts and adapted to limit the downward movement of said push bars.

BRUNO F. ARPS.

REFERENCES CITED

The following references are of record in the file of this patent:

UNITED STATES PATENTS

| Number | Name | Date |
|---|---|---|
| 1,913,472 | Blumberg et al. | June 13, 1933 |
| 1,954,345 | Burrows | Apr. 10, 1934 |
| 2,254,690 | Love | Sept. 2, 1941 |
| 2,301,102 | Werthman et al. | Nov. 3, 1942 |
| 2,306,313 | Johnson | Dec. 22, 1942 |
| 2,334,010 | Jones et al. | Nov. 9, 1943 |
| 2,391,857 | Arps et al. | Jan. 1, 1946 |
| 2,393,299 | Denning | Jan. 22, 1946 |
| 2,395,634 | Martin | Feb. 26, 1946 |
| 2,402,071 | Nehring | June 11, 1946 |
| 2,403,808 | Laughead | July 9, 1946 |
| 2,405,114 | Coats | Aug. 6, 1946 |